United States Patent
Okada et al.

(10) Patent No.: US 8,240,415 B2
(45) Date of Patent: Aug. 14, 2012

(54) CONSTRUCTION MACHINE

(75) Inventors: Kazumasa Okada, Koka (JP); Masao Nakamura, Tsukuba (JP); Makoto Matsushita, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 191 days.

(21) Appl. No.: 12/740,218

(22) PCT Filed: Apr. 21, 2009

(86) PCT No.: PCT/JP2009/057925
§ 371 (c)(1),
(2), (4) Date: Apr. 28, 2010

(87) PCT Pub. No.: WO2010/013521
PCT Pub. Date: Feb. 4, 2010

(65) Prior Publication Data
US 2010/0242313 A1  Sep. 30, 2010

(30) Foreign Application Priority Data
Jul. 29, 2008  (JP) .................. 2008-194994

(51) Int. Cl.
B62D 25/24  (2006.01)

(52) U.S. Cl. ... 180/89.17; 49/397; 180/69.2; 296/146.6; 296/190.11

(58) Field of Classification Search ............ 37/466; 49/397, 398, 402, 502; 172/776; 180/69.2, 180/69.21, 89.1, 89.17; 280/762; 296/146.5, 296/146.6, 146.8, 146.9, 146.11, 190.11, 296/193.11; 312/109, 326, 329
See application file for complete search history.

(56) References Cited

U.S. PATENT DOCUMENTS

| | | | | |
|---|---|---|---|---|
| 4,848,498 A * | 7/1989 | Hart et al. ............ | 180/69.2 |
| 5,624,170 A * | 4/1997 | Hasty ............ | 312/329 |
| 5,715,615 A * | 2/1998 | Murakami et al. ............ | 37/379 |
| 6,502,896 B1 * | 1/2003 | Nakata et al. ............ | 296/190.05 |
| 6,615,942 B2 * | 9/2003 | Shinohara et al. ............ | 180/69.21 |
| 7,134,519 B2 * | 11/2006 | Imashige ............ | 180/69.24 |
| 7,188,865 B2 * | 3/2007 | Sugiyama et al. ............ | 280/759 |
| 7,255,189 B2 * | 8/2007 | Kurtz et al. ............ | 180/68.4 |
| 7,320,380 B2 * | 1/2008 | Ueda et al. ............ | 180/327 |
| 7,575,272 B2 * | 8/2009 | Ishii et al. ............ | 296/190.04 |
| 7,591,334 B2 * | 9/2009 | Eckersley et al. ............ | 180/69.24 |
| 7,806,214 B2 * | 10/2010 | Tsukui et al. ............ | 180/89.17 |
| 7,810,597 B2 * | 10/2010 | Imashige ............ | 180/69.2 |
| 7,828,097 B2 * | 11/2010 | Kondou et al. ............ | 180/68.1 |
| 7,967,094 B2 * | 6/2011 | Matsushita et al. ............ | 180/69.2 |
| 2005/0279548 A1 * | 12/2005 | Kurtz et al. ............ | 180/68.6 |

FOREIGN PATENT DOCUMENTS

| | | |
|---|---|---|
| EP | 1 967 656 A1 | 9/2008 |
| JP | 2002-105984 A | 4/2002 |
| JP | 2005188219 A * | 7/2005 |
| JP | 2007-169926 A | 7/2007 |
| JP | 2007-170130 A | 7/2007 |

* cited by examiner

Primary Examiner — Paul N Dickson
Assistant Examiner — Laura Freedman
(74) Attorney, Agent, or Firm — Mattingly & Malur, PC

(57) ABSTRACT

An intermediate plate member (22) having a plate thickness equal to or less than that of a door body (19) is provided between the door body (19) and a reinforcing member (24) constituting a right side door (18). The door body (19) and the intermediate plate member (22) are jointed by spot welding, and the intermediate plate member (22) and the reinforcing member (24) are jointed by fillet welding, thereby jointing the reinforcing member (24) through the intermediate plate member (22) on the inner side surface (19A) of the door body (19). Through the use of the intermediate plate member (22), the generation of distortion in the door body (19) is reduced and the outer appearance of the right side door (18) is maintained in good condition.

4 Claims, 9 Drawing Sheets

CONSTRUCTION MACHINE

TECHNICAL FIELD

The present invention relates to a construction machine such as a hydraulic excavator or hydraulic crane, and particularly to a construction machine equipped with an openable and closable door constituting a part of a housing cover.

BACKGROUND ART

A hydraulic excavator as a representative example of a construction machine generally comprises an automotive lower traveling structure, an upper revolving structure swingably mounted on the lower traveling structure, and a working mechanism mounted liftably in a front side of the upper revolving structure, and a ground excavating operation is performed by lifting up and down the working mechanism.

The upper revolving structure is configured mainly by a revolving frame as a base, a cab defining an operation room located at a left front portion of the revolving frame, a counterweight located in a rear end portion of the revolving frame to serve as a weight balance to the working mechanism, and a housing cover located in a front side of the counterweight to accommodate onboard equipments such as an engine and a hydraulic pump.

Here, the housing cover is composed of an upper surface cover, an engine cover, a left side surface cover, and a right side surface cover, for example. Further, each of the left and right side surface covers is usually configured by an openable and closable door for carrying out an inspection work on the onboard equipments. The door constituting the housing cover is usually comprised of a door body formed by using a thin steel plate member and a reinforcing member jointed on an inner side surface of the door body to enhance strength thereof (for example, see Patent Literature 1).

Patent Literature 1: Japanese Patent Laid-Open No. 2007-170130

In recent years, a demand for outer appearance beauty (design) of the construction machine has been increasing, and in regard to the door constituting the housing cover also, a door having a three-dimensional curved surface configuration is becoming mainstream. Therefore, the door body and the reinforcing member constituting the door are respectively press-formed by a press die and thereafter, are jointed with each other by spot welding.

In a case of using the press die for forming the reinforcing member, however, use of this press die requires a huge amount of expenditures, resulting in an increase in manufacturing cost of the door. On the other hand, in the conventional art for reducing the manufacturing cost of the door, there is adopted a method in which only the door body is press-formed by using the press die and the reinforcing member is formed by a bending process without use of the press die, wherein the door body and the reinforcing member are jointed by fillet welding.

DISCLOSURE OF THE INVENTION

However, in a case where the door body press-formed in the three-dimensional curved surface configuration by using the press die and the reinforcing member formed by the bending process as described above are abutted against each other, a slight gap is to be generated therebetween due to a difference between the three-dimensional curved surface and the flat surface. Therefore, in a case of welding the reinforcing member on an inner side surface of the door body, the door body is forced to be pulled toward the reinforcing member by an amount of the slight gap formed therebetween because rigidity (strength) of the door body is lower than that of the reinforcing member. As a result, there exists a problem that the door body determining an outer appearance of the hydraulic excavator is distorted, thus deteriorating the outer appearance beauty of the entire hydraulic excavator.

In view of the above-discussed problem with the conventional art, it is an object of the present invention to provide a construction machine which can enhance the outer appearance beauty of a door and reduce manufacturing costs of the door.

(1) In order to achieve the above-mentioned problem, the present invention is applied to a construction machine comprising an automotive vehicle body, onboard equipments including an engine mounted on the vehicle body, and a housing cover accommodating the onboard equipments therein and provided with a door which opens and closes at the time of inspecting an inside thereof, wherein the door of the housing cover is provided with a door body formed by use of a plate member and a reinforcing member jointed on an inner side surface of the door body to enhance the strength of the door body.

Further, the feature of the configuration adopted by the present invention is in a point that an intermediate plate member having a plate thickness equal to or less than that of the door body is provided between the door body and the reinforcing member.

According to this configuration, the door body and the reinforcing member can be jointed through the intermediate plate member provided therebetween. In this case, a thin plate equal to or less than the plate thickness of the door body is used as the intermediate plate member and an area of the intermediate plate member is smaller than that of the door body. Therefore, the intermediate plate member is lower in rigidity (strength) as compared to the door body. In consequence, in a case where the door body and the intermediate plate member are jointed by welding or the like, since the rigidity (strength) of the door body is larger than that of the intermediate plate member, distortion is generated in the intermediate plate member lower in rigidity (strength) at the time of jointing. By thus absorbing the distortion generated at the time of jointing the door body and the reinforcing member with the intermediate plate member provided therebetween, generation of the distortion in the door body can be restricted.

As a result, by using the reinforcing member formed inexpensively without use of the press die, even in a case where a minute gap is formed between the reinforcing member and the door body, generation of the distortion in the door body can be certainly restricted by providing the intermediate plate member between the reinforcing member and the door body. Accordingly, the outer appearance beauty of the housing cover including the door can be enhanced and the manufacturing costs of the door can be reduced by use of the inexpensive reinforcing member.

(2) In addition, the present invention is configured so that the reinforcing member is located closer to one side of the door body in the forward and rearward directions and is provided with a hinge attached to a member of the vehicle body side. As a result, it is possible to open and close the door body around the hinge provided in the reinforcing member.

(3) On the other hand, the present invention is configured so that the door body is formed in a three-dimensional curved surface configuration by use of a press die; the reinforcing member is formed as a frame body in a U-shape in section; and the intermediate plate member is formed as a flat plate.

Since the door body is thus formed in a three-dimensional curved surface configuration by using the press die, the outer appearance beauty of the housing cover including the door body can be enhanced. In addition, by forming the reinforcing member as the frame body in a U-shape in section, the strength of the reinforcing member itself can be enhanced. As a result, it is possible to enhance the strength of the door body to which the reinforcing member is jointed through the intermediate plate member. Further, the reinforcing member is formed as the frame body in a U-shape in section and the intermediate plate member is formed as the flat plate. Therefore, it is not necessary to use an expensive press die at the time of forming the reinforcing member and the intermediate plate member, thereby enabling the manufacturing costs of the entire door to be reduced.

(4) Further, the present invention is configured so that the door body and the intermediate plate member are jointed by spot welding; and the intermediate plate member and the reinforcing member are jointed by fillet welding.

By thus jointing the intermediate plate member and the reinforcing member by the fillet welding, it is possible to strongly joint the intermediate plate member and the reinforcing member. In addition, by jointing the door body and the intermediate plate member by the spot welding, it is possible to restrict the generation of distortion in the door body to keep the good outer appearance beauty.

BRIEF DESCRIPTION OF THE DRAWINGS

In the accompanying drawings:

FIG. 4 is a perspective view showing a revolving frame, a fuel tank, a right side door and the like;

DESCRIPTION OF REFERENCE NUMERALS

Figure 1:
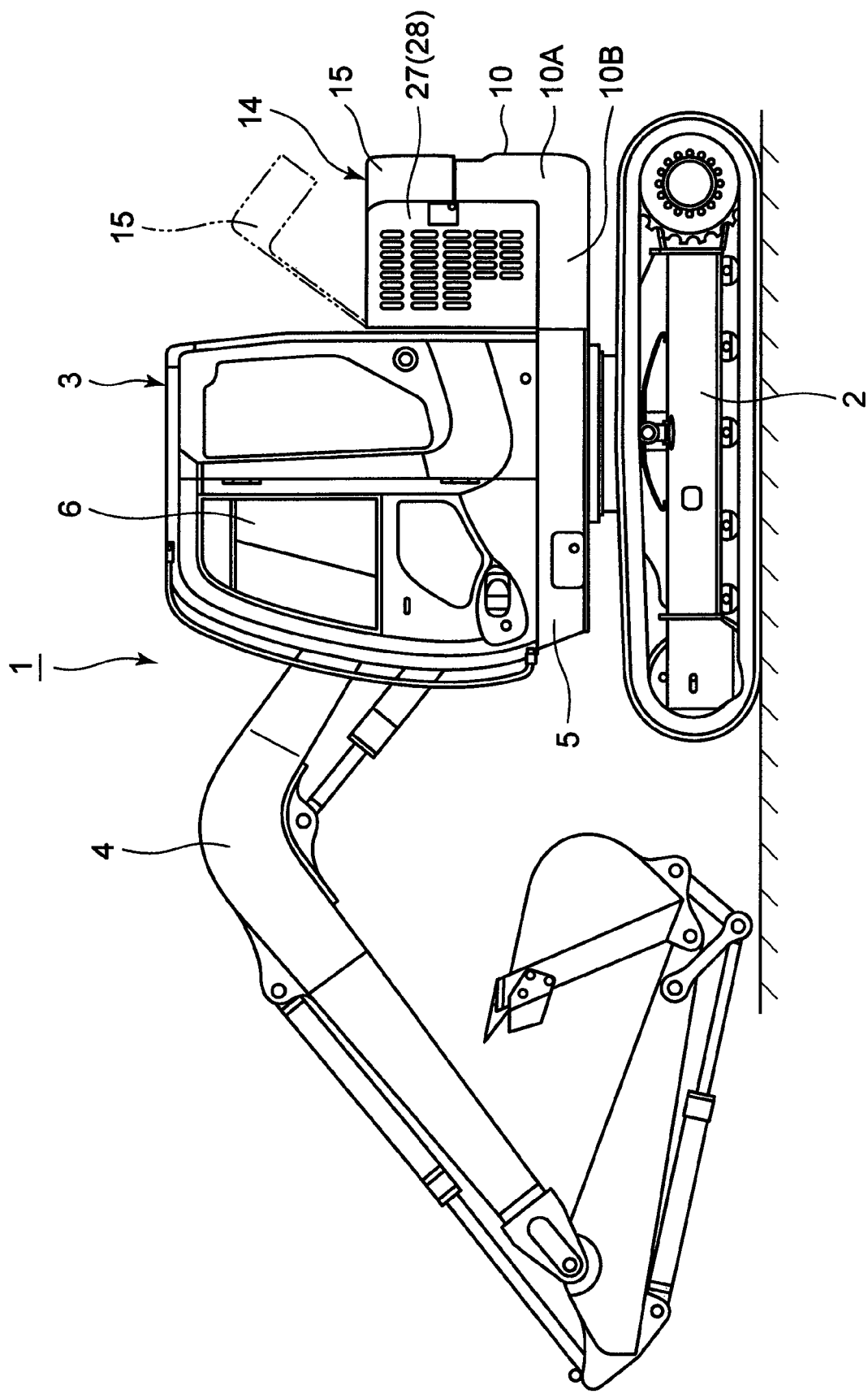
FIG. 1 is a front view showing a hydraulic excavator according to an embodiment of the present invention.

1: Hydraulic excavator (construction machine)
2: Lower traveling structure (vehicle body)
3: Upper revolving structure (vehicle body)
7: Engine (onboard equipment)
8: Heat exchanger (onboard equipment)
9: Hydraulic pump (onboard equipment)
11: Fuel tank (member of a vehicle body side)
14: Housing cover
18: Right side door (door)
19, 28: Door body
19A: Inner side surface
22: Intermediate plate member
23: Spot welding portion
24: Reinforcing member
25: Fillet welding portion
26: Hinge
27: Left side door (door)

BEST MODE FOR CARRYING OUT THE INVENTION

Hereinafter, a case where an embodiment of a construction machine according to the present invention is applied to a hydraulic excavator will be taken as an example, which will be explained with reference to the accompanying drawings.

In the drawings, denoted at 1 is a hydraulic excavator as a representative example of a construction machine. A vehicle body of the hydraulic excavator 1 is largely constituted by an automotive lower traveling structure 2 of a crawler type and an upper revolving structure 3 rotatably mounted on the lower traveling structure 2. A working mechanism 4 is provided liftably on the front side portion of the upper revolving structure 3, carrying out a ground excavating operation and other ground work.

Figure 4:
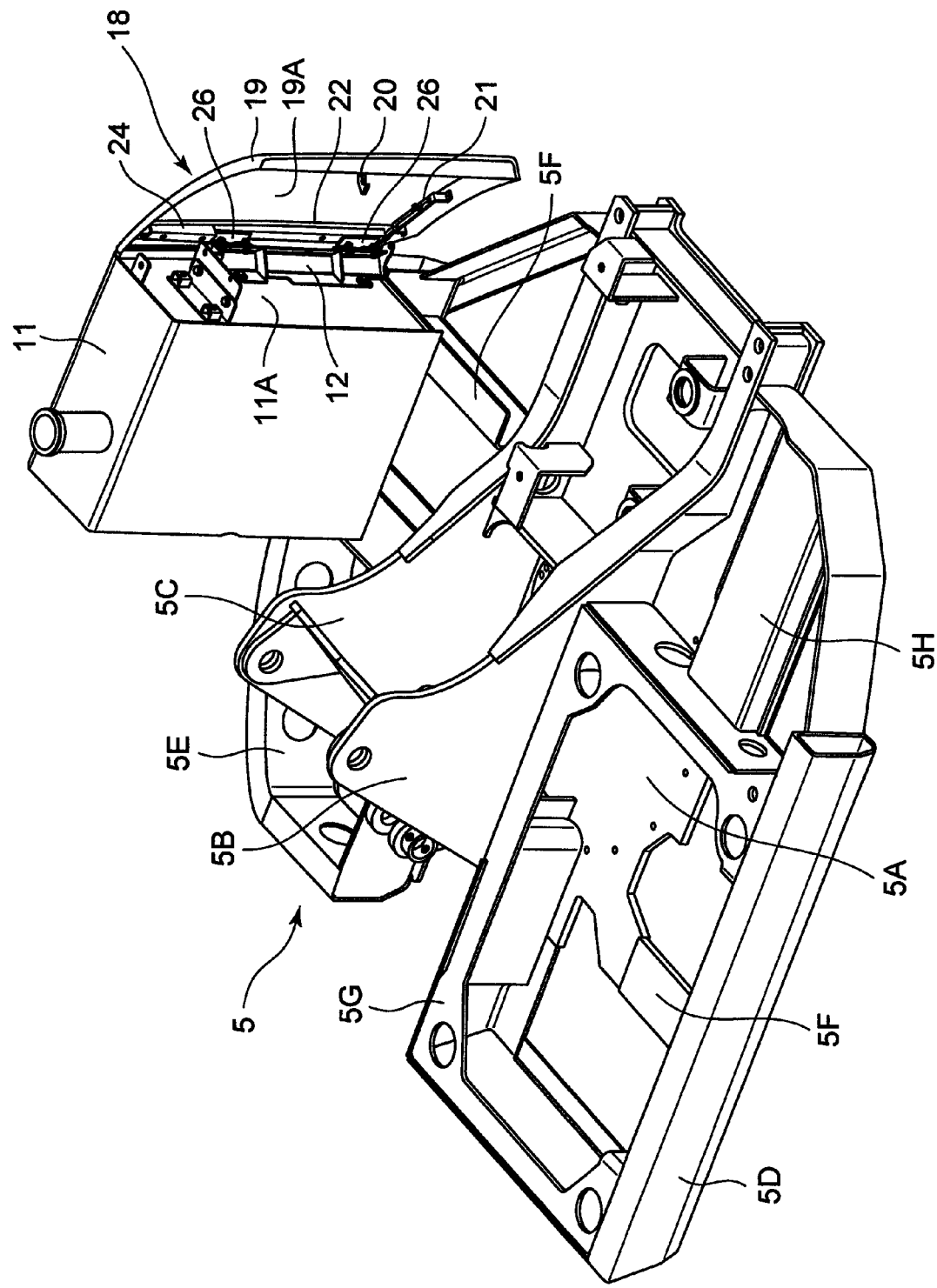

Denoted at 5 is a revolving frame as a base of the upper revolving structure 3. The revolving frame 5 is, as shown in FIG. 4, configured mainly by a bottom plate 5A formed of a thick steel plate or the like extending in the forward and rearward directions, left and right vertical plates 5B and 5C erected on the bottom plate 5A, opposing with each other at a given interval in the left and right directions and extending in the forward and rearward directions, a left side frame 5D located in the left side of the left vertical plate 5B and extending in the forward and rearward directions, a right side frame 5E located in the right side of the right vertical plate 5C and extending in the forward and rearward directions, and a plurality of extension beams 5F providing connection between the bottom plate 5A and the left and right side frames 5D and 5E to form a strong support structure.

A base end of the working mechanism 4 is supported on the front side portion of the left and right vertical plates 5B and 5C lifted up in a mountain shape from the bottom plate 5A in such a way as to rotate in the upward and downward directions. On the other hand, an engine 7 and a counterweight 10, which will be described later, are mounted at the rear side portion of the left and right vertical plates 5B and 5C. Further, a cab support frame 5G supporting a cab 6 to be described later is provided between the left vertical plate 5B and the left side frame 5D. A heat exchanger support base 5H supporting a heat exchanger 8 to be described later is provided at the rear side of the cab support frame 5G.

Denoted at 6 is a cab located on the left side of the front portion of the revolving frame 5 and the cab 6 is supported on the cab support frame 5G of the revolving frame 5 to define an operation room. In addition, an operation seat for an operator, a control lever for traveling, a control lever for working and the like (any thereof is not shown) are located inside the cab 6.

Denoted at 7 is an engine mounted on the rear side portion of the revolving frame 5 and the engine 7 is located in a horizontal state extending in the left and right directions. The heat exchanger 8 for cooling engine cooling water, operating oil and the like is located in the left side of the engine 7. On the other hand, a hydraulic pump 9 is attached to the right side of the engine 7, which is driven by the engine 7 to discharge pressurized oil for operating to various hydraulic actuators mounted in the hydraulic excavator 1. The engine 7, the heat exchanger 8, the hydraulic pump 9 and the like constitute the onboard equipments mounted on the revolving frame 5, and are configured so as to be accommodated in the housing cover 14 to be described hereinafter.

Denoted at 10 is a counterweight mounted on the rear end portion of the revolving frame 5 to be positioned in the rear side of the engine 7. The counterweight 10 serves as a weight balance to the working mechanism 4. Here, the counterweight 10 is configured by a central weight portion 10A located at the center portion in the left and right directions to be positioned in the rear side of the engine 7, a left front weight portion 10B extending forward from the left lower side of the central weight portion 10A toward the left side frame 5D of the revolving frame 5, and a right front weight portion 10C extending forward from the right lower side of the central weight portion 10A toward the right side frame 5E of the revolving frame 5 to be formed in an arc shape as a whole. The central weight portion 10A is configured to be erected upward from the revolving frame 5 for covering a part of the engine 7 and the like from the rear side.

Figure 5:
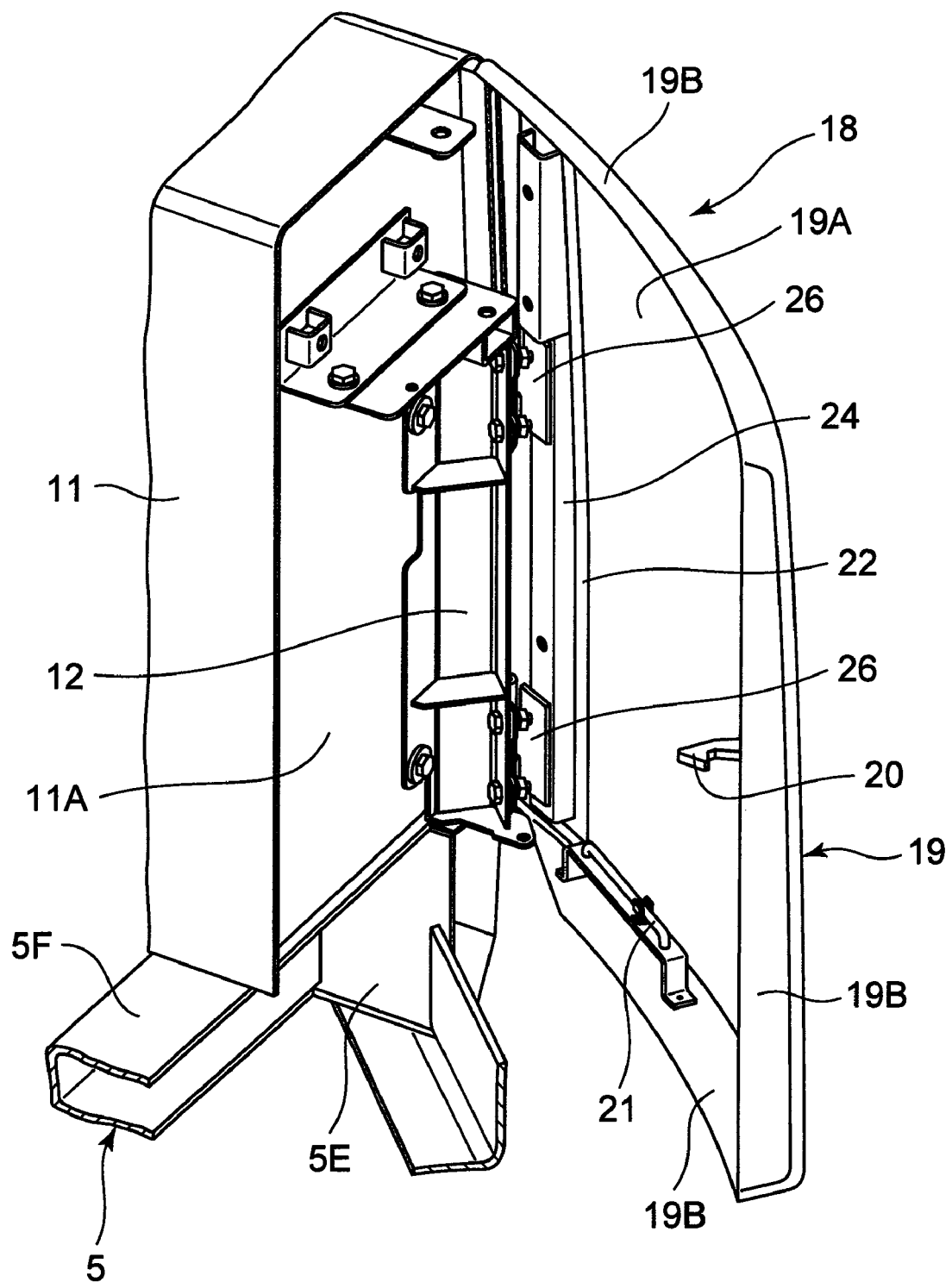
FIG. 5 is a partially enlarged perspective view shown by enlarging the fuel tank and the right side door in FIG. 4.
Figure 6:
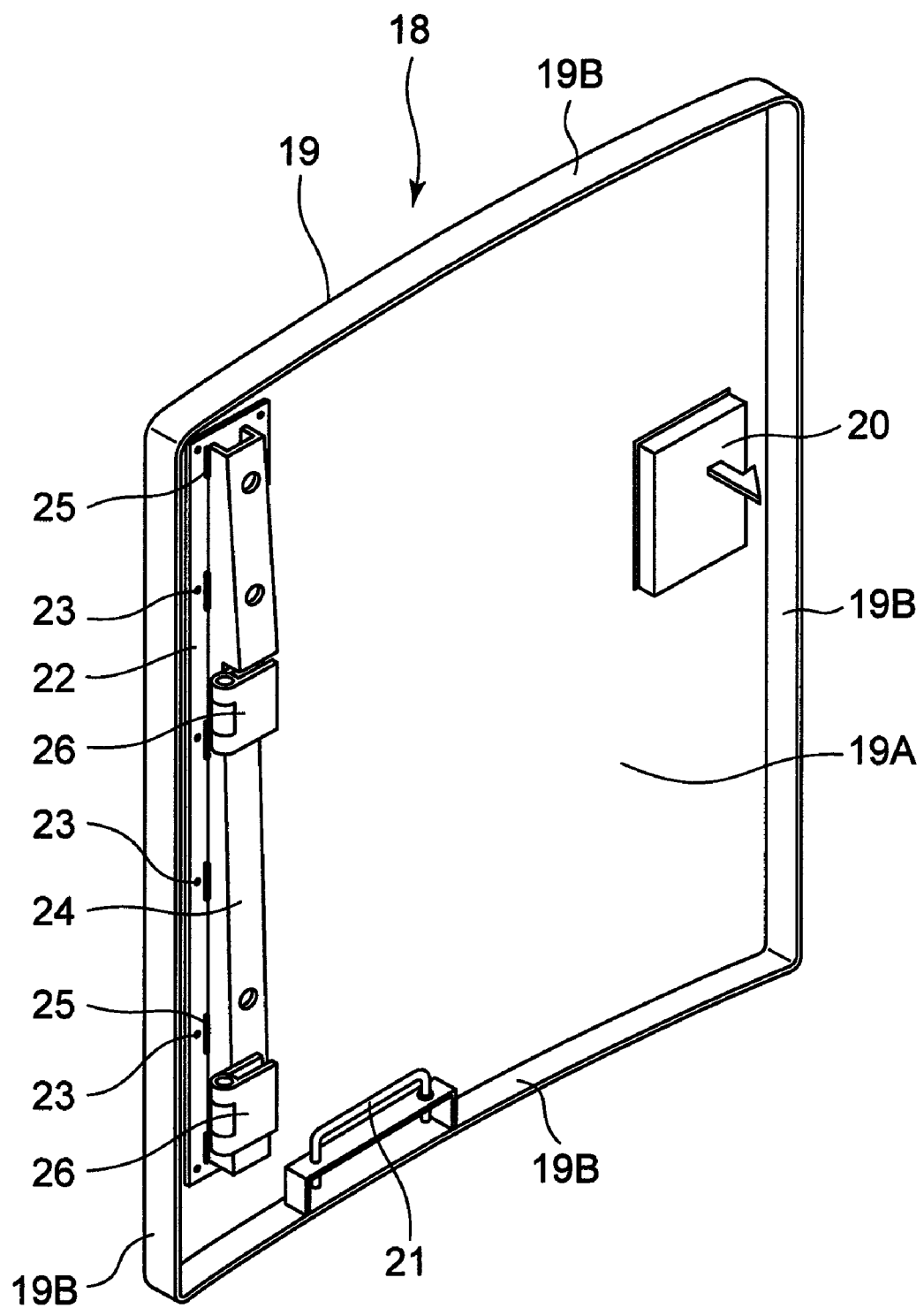
FIG. 6 is a perspective view showing the right side door as a single unit.

Denoted at 11 is a fuel tank. The fuel tank 11 is located in the face of the hydraulic pump 9 and in the right position of the revolving frame 5 to be continuous with the right front weight portion 10C of the counterweight 10. The fuel tank 11 serves to reserve fuel supplied to the engine 7. Further, the fuel tank 11 constitutes a member of the vehicle body side to which a right side door 18 to be described later is attached. In this instance, as shown in FIG. 5, a door support bracket 12 extending in the upward and downward directions is fixedly provided on the rear surface 11A of the fuel tank 11, and the right side door 18 to be described later is attached in the door support bracket 12 to be openable and closable.

Denoted at 13 is an operating oil tank located adjacent to the left side of the fuel tank 11. The operating oil tank 13 serves to reserve operating oil supplied to the hydraulic actuator provided in the hydraulic excavator 1.

Figure 2:
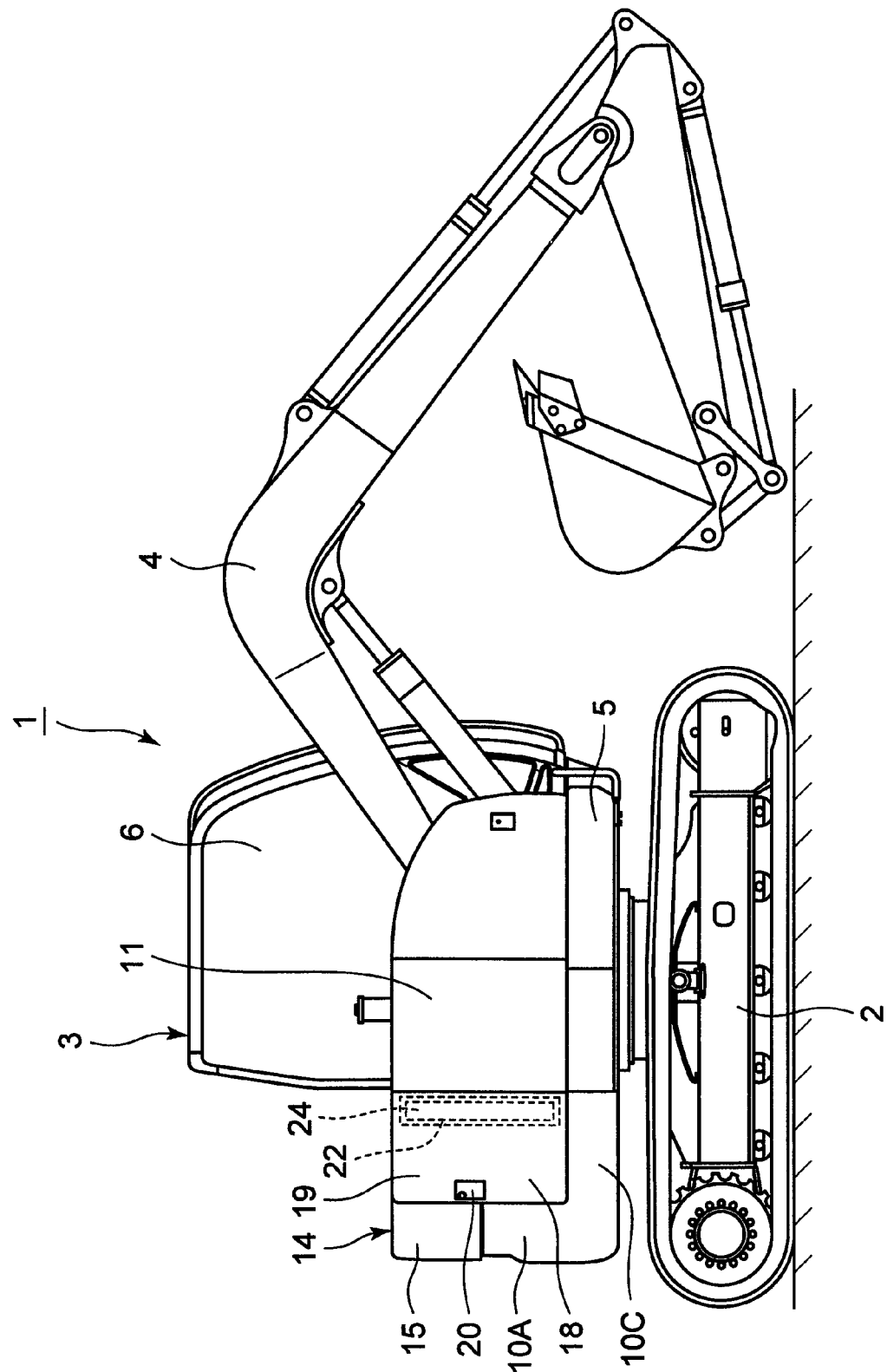
FIG. 2 is a rear view of the hydraulic excavator shown in FIG. 1.
Figure 3:
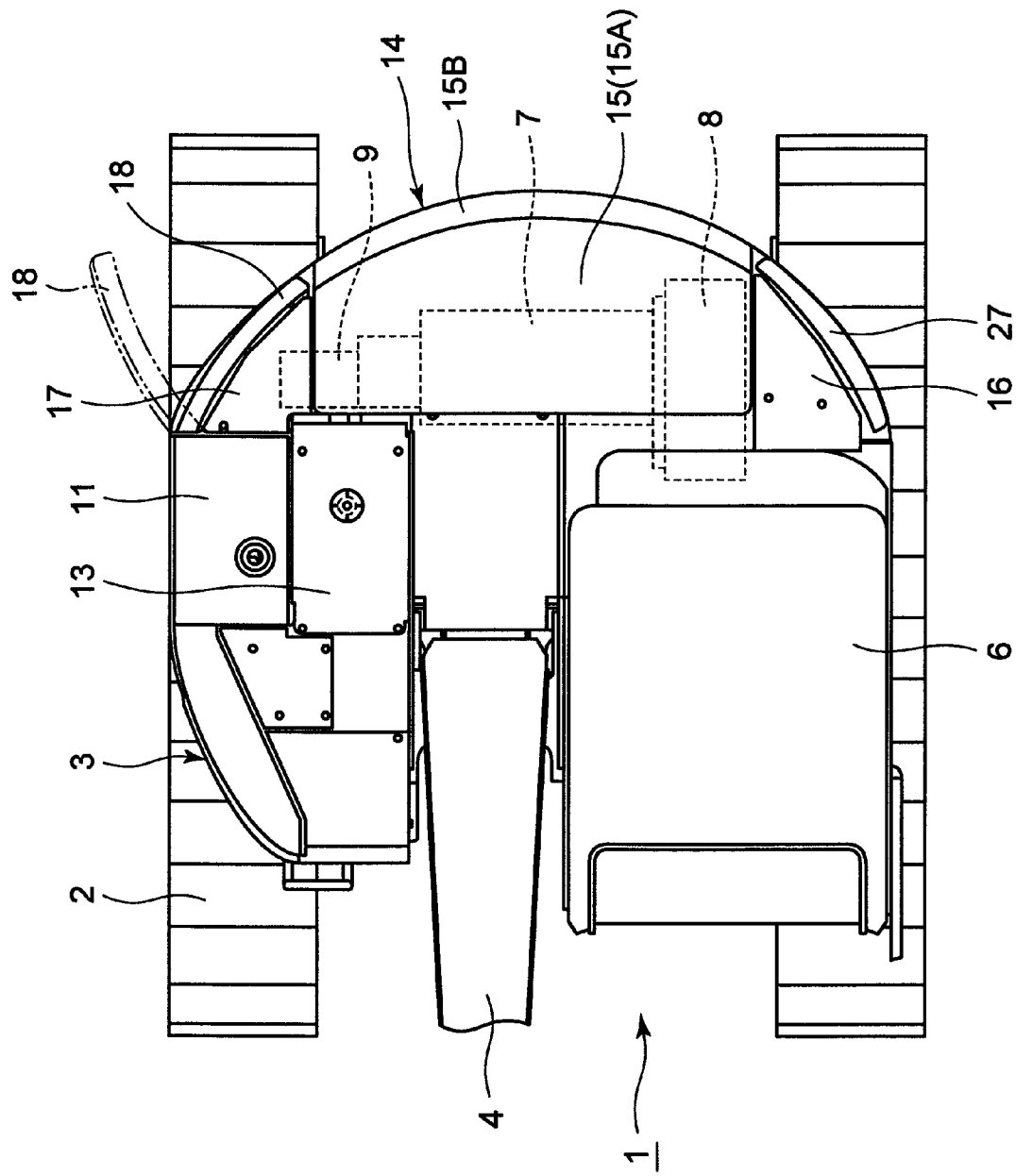
FIG. 3 is a plan view showing the hydraulic excavator shown in FIG. 1 as viewed from above.

Denoted at 14 is a housing cover located on the revolving frame 5 to be positioned among the cab 6, the fuel tank 11, and the counter weight 10. The housing cover 14 accommodates therein onboard equipments such as the engine 7, the heat exchanger 8, and the hydraulic pump 9. Here, the housing cover 14 is, as shown in FIGS. 1 to 3, configured by an engine cover 15, a left upper surface cover 16, a right upper surface cover 17, the right side door 18, a left side door 27 and the like, which will be described later.

Denoted at 15 is an engine cover which covers the engine 7, the heat exchanger 8, the hydraulic pump 9 and the like from upward and rearward to be openable and closable. In this instance, the engine cover 15 is largely constituted by an upper surface plate 15A extending in the left and right directions and a rear surface plate 15B bent from the rear end side of the upper surface plate 15A to the downward and bent in an arc shape along a rear surface of the counterweight 10 in a state of covering the upward side of the engine 7 or the like. The front end side of the upper surface plate 15A is mounted through a hinge in the support bracket (both are not shown) located on the revolving frame 5 to rotate in the upward and downward directions. Therefore, upon performing an inspection work on the engine 7 or the like, the engine cover 15 is configured to open and close between a closing position shown in a solid line and an open position shown in a two-dot chain line in FIG. 1.

Denoted at 16 is a left upper surface cover located in the left side of the engine cover 15, and the left upper surface cover 16 is formed substantially in a flat plate-like shape of a triangle. The left upper surface cover 16 is fixed adjacent to the left side of the upper surface plate 15A constituting the engine cover 15 to cover the heat exchanger 8 or the like together with the engine cover 15 from above.

Denoted at 17 is a right upper surface cover located in the right side of the engine cover 15, and the right upper surface cover 17 is formed substantially in a flat plate-like shape of a triangle. The right upper surface cover 17 is fixed adjacent to the right side of the upper surface plate 15A constituting the engine cover 15 to cover the hydraulic pump 9 or the like together with the engine cover 15 from above.

Here, the right side door 18 constituting a major part of the present embodiment will be explained.

Namely, denoted at 18 is the right side door located between the counterweight 10 and the fuel tank 11 to be positioned under the right upper surface cover 17. The right side door 18 serves to cover the hydraulic pump 9 or the like from the right side so as to be openable and closable. In this case, the right side door 18 is positioned on the upper side of the right front weight portion 10C of the counterweight 10. In this case, as shown in FIGS. 6 to 9, the right side door 18 is largely constituted by a door body 19, an intermediate plate member 22, and a reinforcing member 24, which will be described hereinafter, and opens and closes between a closing position shown in a solid line and an open position shown in a two-dot chain line in FIG. 3.

Denoted at 19 is the door body forming an outer shell of the right side door 18, and the door body 19 is bent in an arc shape in the forward and rearward directions and formed in a three-dimensional curved surface configuration to be gradually curved in the upward and downward directions by executing press work on a thin steel plate member by using a press die, for example. Thereby, the right side door 18 is configured to be smoothly continued with the counterweight 10 and the fuel tank 11, enhancing the outer appearance beauty of the entire hydraulic excavator 1.

In this case, the reinforcing member 24 is jointed on an inner side surface 19A of the door body 19 through the intermediate plate member 22 to be described later. Further, four bending portions 19B respectively bent to the side of the inner side surface 19A are formed at both end portions of the door body 19 in the upward and downward directions and at both end portions of the door body 19 in the forward and rearward directions. The respective bending portions 19B and the reinforcing member 24 are configured to be capable of holding rigidity (strength) of the door body 19. A door lock device 20 is attached to the rear side portion of the door body 19 for locking the right side door 18 in a closing position. Further, a door holding stay 21 formed of a bar material of which both ends are bent is attached to the bending portion 19B at the lower end side of the door body 19, and the right side door 18 is held in an open position by the door holding stay 21.

Denoted at 22 is an intermediate plate member provided between the door body 19 and the reinforcing member 24 to be described later. The intermediate plate member 22 is formed as a band-shaped flat plate extending in the upward and downward directions by using a thin steel plate member having a plate thickness equal to or less than that of the door body 19 and is gradually curved along a curvature surface of the door body 19 in the upward and downward directions. The intermediate plate member 22 is formed to be gradually curved in the upward and downward directions (length direction) by using not a press die but a roller device, for example.

Figure 9:
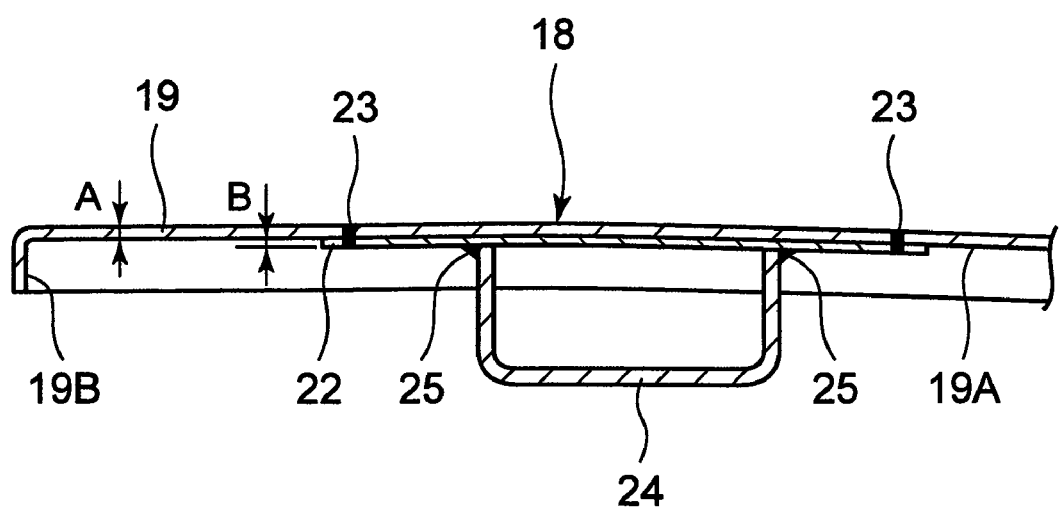
FIG. 9 is an enlarged sectional view showing the door body, the intermediate plate member, and the reinforcing member taken from the direction of arrow IX-IX in FIG. 8.

In this case, as shown in FIG. 9, assuming the plate thickness of the door body 19 as A, and the plate thickness of the intermediate plate member 22 as B, the plate thickness B of the intermediate plate member 22 is set to a value equal to or less than the plate thickness A of the door body 19, for example, in a range of the following Formula 1.

$$\frac{A}{5} \leq B \leq A \qquad \text{[Formula 1]}$$

Further, the plate thickness B of the intermediate plate member 22 is preferably set in a range of the following Formula 2.

$$\frac{2}{5}A \leq B \leq A \qquad \text{[Formula 2]}$$

Figure 7:
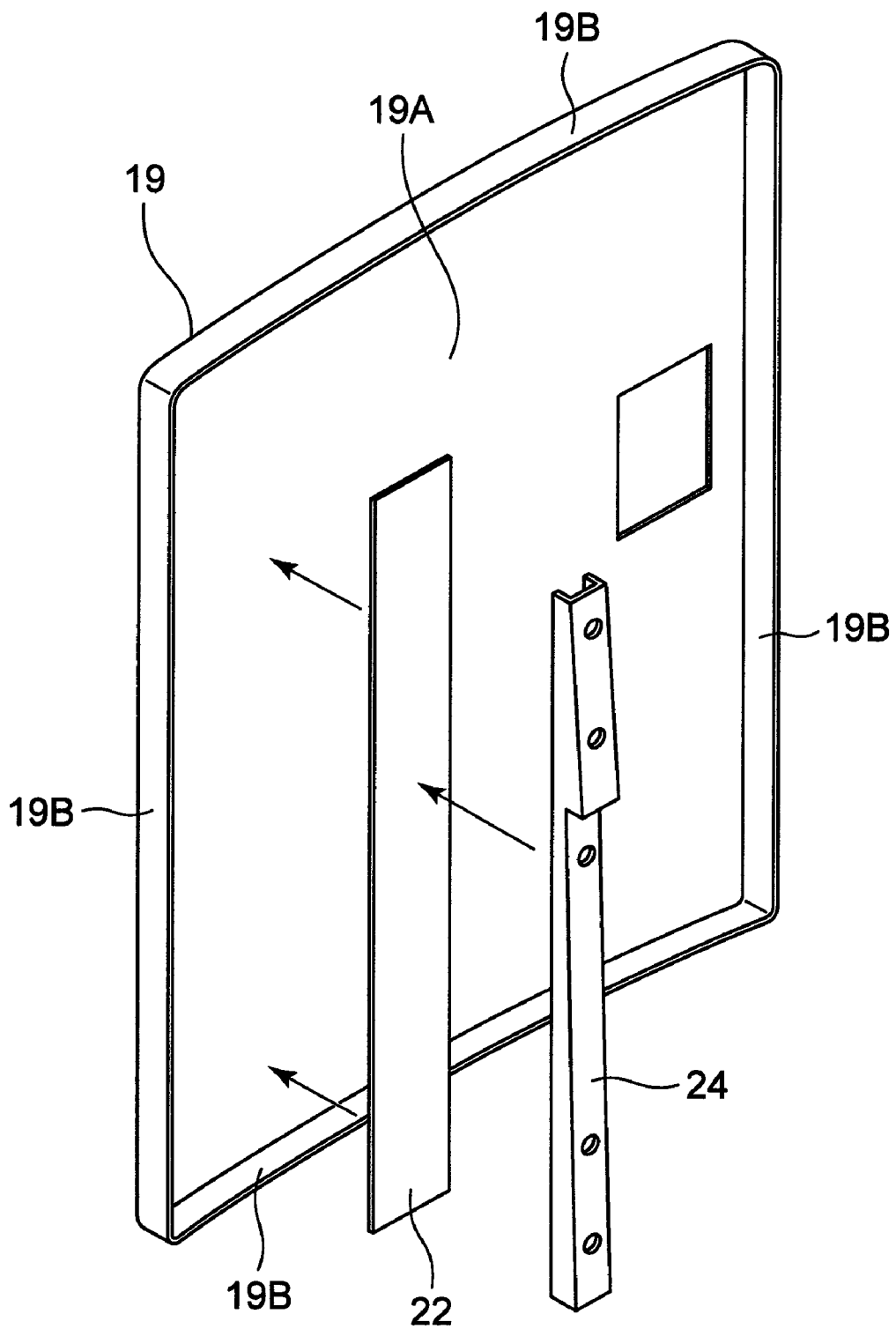
FIG. 7 is an exploded perspective view showing a door body, an intermediate plate member, and a reinforcing member in an exploded state.
Figure 8:
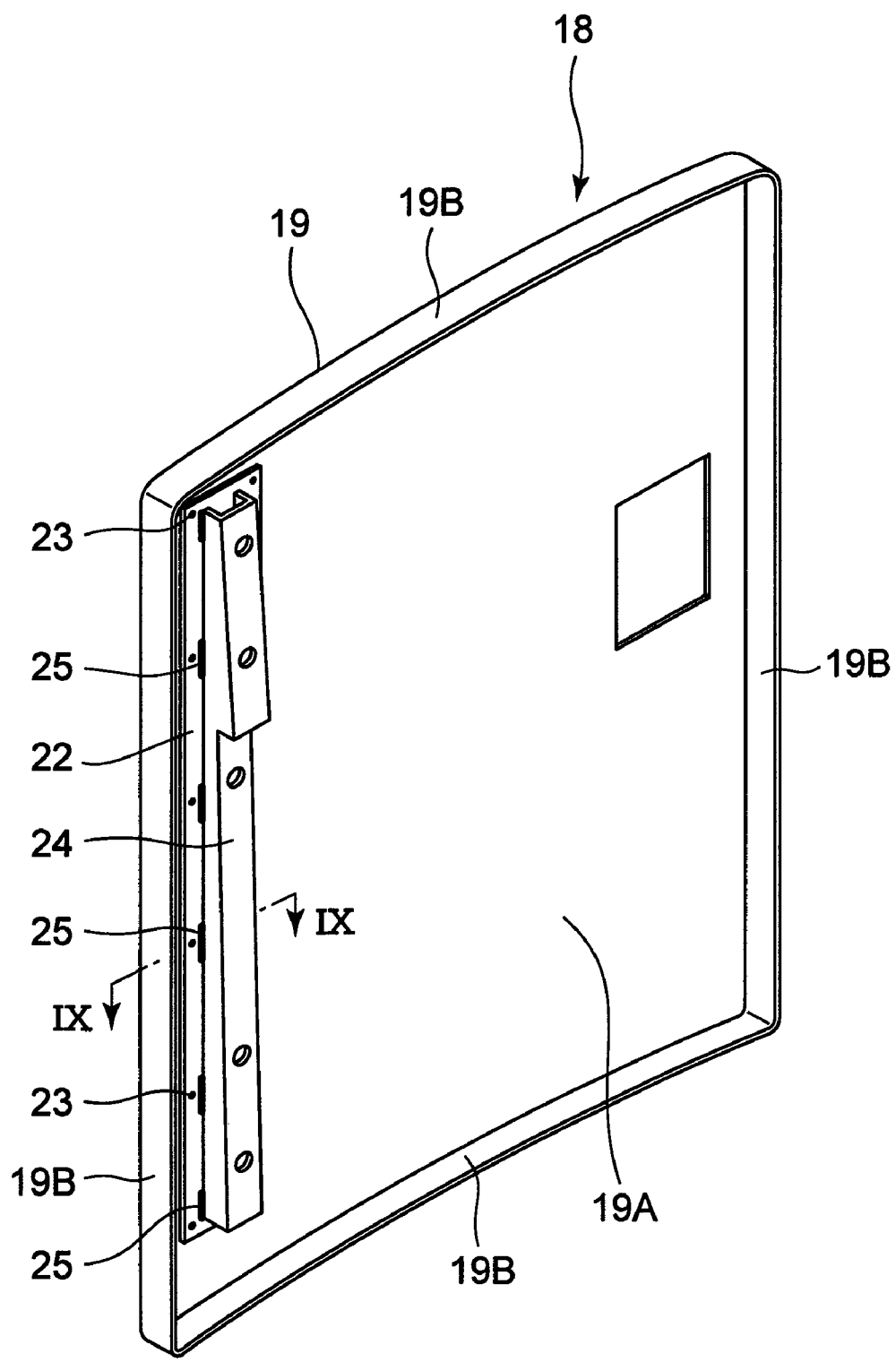
FIG. 8 is a perspective view showing a state where the reinforcing member is jointed on the door body through the intermediate plate member.

As shown in FIGS. 7 to 9, the intermediate plate member 22 contacts against the inner side surface 19A of the door body 19 in a state of extending in the upward and downward directions and is jointed on the door body 19 by spot welding, for example, to form a plurality of spot welding portions 23 between the door body 19 and the intermediate plate member 22 at appropriate intervals in the upward and downward directions (see FIGS. 8 and 9). In this case, the plate thickness B of the intermediate plate member 22 is set equal to or less than the plate thickness A of the door body 19 and an area of the intermediate plate member 22 is smaller than that of the door body 19. Therefore, the rigidity (strength) of the intermediate plate member 22 is much lower than that of the door body 19.

For this reason, even if the door body 19 and the intermediate plate member 22 are jointed by spot welding in a state where a slight gap is generated between the inner side surface 19A of the door body 19 and the intermediate plate member 22, distortion is generated only in the intermediate plate member 22 lower in rigidity, and the door body 19 and the intermediate plate member 22 are jointed in a state where the intermediate plate member 22 is pulled toward the side of the door body 19 higher in rigidity. Therefore, at the time of jointing the intermediate plate member 22 by spot welding, the intermediate plate member 22 absorbs the welding distortion, making it possible to maintain the outer appearance beauty of the door body 19 appropriately.

In this way, in a case where the door body 19 has a two-dimensional curved surface configuration or a three-dimensional curved surface configuration, the intermediate plate member 22 lower in strength deforms in accordance with the configuration of the door body 19 higher in strength to be jointed on the door body 19. Accordingly, since the flat plate-shaped intermediate plate member 22 can be jointed on the door body 19 having the three-dimensional curved surface configuration without any gap, it is not necessary to carry out bending work for the intermediate plate member 22 in accordance with the configuration of the door body 19 and it is possible to reduce the manufacturing cost of the intermediate plate member 22 thereby.

Denoted at 24 is a reinforcing member located closer to one side (front side) of the door body 19 in the forward and rearward directions. The reinforcing member 24 is jointed through the intermediate plate member 22 on the inner side surface 19A of the door body 19 to enhance strength of the door body 19. In this instance, the reinforcing member 24 is formed as a frame body in a U-shape in section by executing the bending process to a steel plate member having the plate thickness larger than that of the plate thickness A of the door body 19 without use of a press die but with use of a bending process device (bender) or the like. In addition, a length dimension and a width dimension of the reinforcing member 24 are set to be one size smaller than those of the intermediate plate member 22 respectively.

As shown in FIGS. 8 and 9, the reinforcing member 24 is jointed on the intermediate plate member 22, for example, by fillet welding in a state of forming a closed space between the intermediate plate member 22 and the reinforcing member 24, and a plurality of fillet welding portions 25 are formed between the reinforcing member 24 and the intermediate plate member 22 at given intervals in the upward and downward directions.

In this way, the right side door 18 has the intermediate plate member 22 between the door body 19 and the reinforcing member 24 for enhancing the strength of the door body 19, the intermediate plate member 22 having the plate thickness B equal to or less than the plate thickness A of the door body 19. Further, the right side door 18 is configured so that the door body 19 and the intermediate plate member 22 are jointed by spot welding, and the intermediate plate member 22 and the reinforcing member 24 are jointed by fillet welding, thereby jointing the reinforcing member 24 through the intermediate plate member 22 on the inner side surface 19A of the door body 19.

Thereby, at the time of jointing the door body 19 and the intermediate plate member 22 by welding, the intermediate plate member 22 having the rigidity lower than that of the door body 19 can be distorted by priority. Therefore, the right side door 18 is configured so that the outer appearance beauty of the right side door 18 including the door body 19 can be maintained appropriately as compared to a case of directly welding the reinforcing member 24 on the inner side surface 19A of the door body 19 as the conventional art.

Denoted at 26 are upper and lower hinges mounted on the reinforcing member 24. The respective hinges 26 are provided between the door support bracket 12 of the fuel tank 11 and the reinforcing member 24 to support the right side door 18 so as to be openable and closable to the fuel tank 11. Accordingly, upon carrying out the inspection work of the hydraulic pump 9 or the like, the right side door 18 is configured so as to open and close around each hinge 26 between a closing position shown in a solid line and an open position shown in a two-dot chain line in FIG. 3.

Denoted at 27 is a left side door, which is positioned under the left upper surface cover 16 and is located between the counterweight 10 and the cab 6 to cover the heat exchanger 8 or the like from the left side so as to be openable and closable.

Further, the left side door 27 is configured in the same way as the right side door 18. That is, the left side door 27 is configured by a door body 28 press-formed by using a press die, and an intermediate plate member and a reinforcing member (neither are shown) jointed on the inner side surface of the door body 28, thereby making it possible to maintain good outer appearance beauty by restricting the distortion of the door body 28.

The hydraulic excavator 1 according to the present embodiment is configured as described above. The hydraulic excavator 1 is driven to a working site by the lower traveling structure 2 and revolves the upper revolving structure 3 to carry out a ground excavating operation by means of the working mechanism 4.

The engine cover 15, the right side door 18, and the left side door 27 respectively are put in an open position before operating the hydraulic excavator 1 to carry out an inspection, repair work and the like to the onboard equipments such as the engine 7, the heat exchanger 8, the hydraulic pump 9 and the like accommodated in the housing cover 14. After the inspection work, the repair work and the like are completed, the engine cover 15, the right side door 18, and the left side door 27 are moved from the open position to the closing position to cover the onboard equipments such as the engine 7.

In this case, according to the present embodiment, the right side door 18 is, as shown in Formula 1 and 2 as described above, provided with the intermediate plate member 22 having the plate thickness B equal to or less than the plate thickness A of the door body 19 between the door body 19 and the reinforcing member 24. The right side door 18 is configured so that the door body 19 and the intermediate plate member 22 are jointed by spot welding, and the intermediate plate member 22 and the reinforcing member 24 are jointed by fillet welding, thereby jointing the reinforcing member 24 through the intermediate plate member 22 on the inner side surface 19A of the door body 19.

Further, the plate thickness B of the intermediate plate member 22 is, as shown in Formula 1 and 2 as described above, set equal to or less than the plate thickness A of the door body 19 and also the area of the intermediate plate member 22 is smaller than that of the door body 19. Therefore, the strength of the intermediate plate member 22 is lower than that of the door body 19. Therefore, even if the door body 19 and the intermediate plate member 22 are jointed by spot welding in a state where a slight gap is generated between the inner side surface 19A of the door body 19 and the intermediate plate member 22, distortion is generated only in the intermediate plate member 22 lower in strength, and the door body 19 and the intermediate plate member 22 are jointed without a gap in a state where the intermediate plate member 22 is pulled toward the side of the door body 19 higher in strength. In this case, although the right side door 18 has a big impact on the outer appearance quality of the hydraulic excavator 1, since it is possible to restrict generation of the distortion in the door body 19, making it possible to maintain the outer appearance beauty of the right side door 18 to be good.

By strongly jointing the reinforcing member 24 by fillet welding on the intermediate plate member 22 which is jointed on the door body 19 without a gap, for example as compared to a case of directly welding the reinforcing member 24 on the inner side surface 19A of the door body 19, the outer appearance beauty of the housing cover 14 including the right side door 18 can be maintained to be in good conditions, thus enhancing an appearance quality and a product quality of the entire hydraulic excavator 1.

In addition, among the door body 19, the intermediate plate member 22, and the reinforcing member 24 constituting the right side door 18, only the door body 19 is formed in a three-dimensional curved surface configuration by using a press die, the intermediate plate member 22 is formed in a flat shape without use of the press die, and the reinforcing member 24 is formed as a frame body in a U-shape in section without use of the press die. Therefore, it is not necessary to use an expensive press die for forming the intermediate plate member 22 and the reinforcing member 24. Accordingly, the outer appearance beauty of the door body 19 can be maintained, reducing the manufacturing costs of the right side door 18.

Further, since the strength of the reinforcing member 24 itself can be enhanced by forming the reinforcing member 24 as a frame body in a U-shape in section, it is possible to enhance the strength of the door body 19 jointed on the reinforcing member 24 through the intermediate plate member 22, enhancing the reliability of the right side door 18.

It should be noted that in the aforementioned embodiment, by way of example, the reinforcing member 24 is provided through the intermediate plate member 22 only on one side of the door body 19 in the forward and rearward directions. However, the present invention is not limited to this particular example. For instance, the reinforcing member 24 may be provided through the intermediate plate member 22 in each of both sides of the door body 19 in the forward and rearward directions.

In the aforementioned embodiment, the hydraulic excavator 1 is exemplified as the construction machine. However, the present invention is not limited to this particular example. For instance, the present invention may be applied widely to a door constituting a housing cover of the other construction machine such as a hydraulic crane or wheel loader.

The invention claimed is:

1. A construction machine comprising:
an automotive vehicle body;
onboard equipment, including an engine, mounted on said automotive vehicle body;
a housing cover accommodating said onboard equipment and provided with a door which opens and closes at the time of inspecting an inside thereof, said door of said housing cover being provided with a door body formed by a door body plate member, said door body plate member having a door body plate member thickness, a door body plate member rigidity and including a door body inner side surface;
a flat, plate-shaped intermediate plate member having an intermediate plate member rigidity less than said door body plate member rigidity and an intermediate plate member thickness equal to or less than said door body plate member thickness, an outer surface of said intermediate plate member being joined to said door body inner side surface by welding, said intermediate plate member having an intermediate plate member length and an intermediate plate member width; and
a reinforcing member joined on an inner surface of said intermediate plate member by welding, said reinforcing member having a reinforcing member length less than said intermediate plate member length and a reinforcing member width less than said intermediate plate member width.

2. The construction machine according to claim 1, wherein said reinforcing member is located closer to one side of said door body in the forward and rearward directions and is provided with a hinge attached to a member of said vehicle body.

3. The construction machine according to claim 1, wherein said door body plate member is formed in a three-dimensional curved surface configuration and said reinforcing member is formed as a frame body having a U-shape in cross-section.

4. The construction machine according to claim 1, wherein said door body plate member and said intermediate plate member are jointed by spot welding further wherein said intermediate plate member and said reinforcing member are jointed by fillet welding.

* * * * *